May 4, 1943. W. J. WHITEHEAD ET AL 2,318,548
MEANS FOR TEMPORARILY RETAINING MEMBERS TOGETHER
Filed June 1, 1942
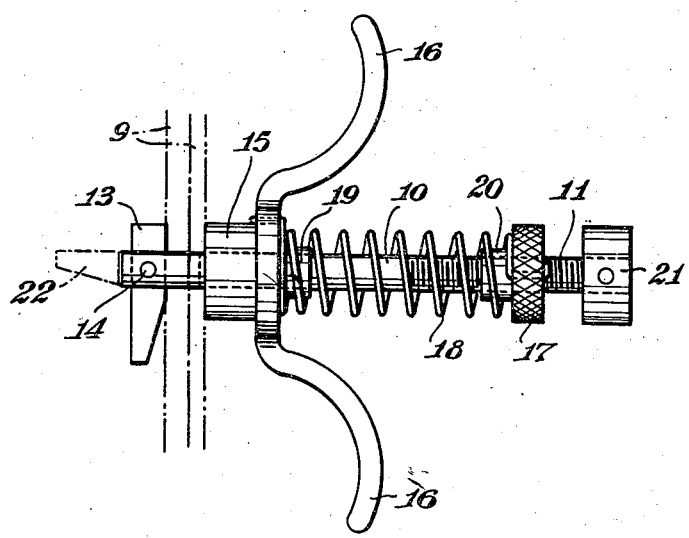
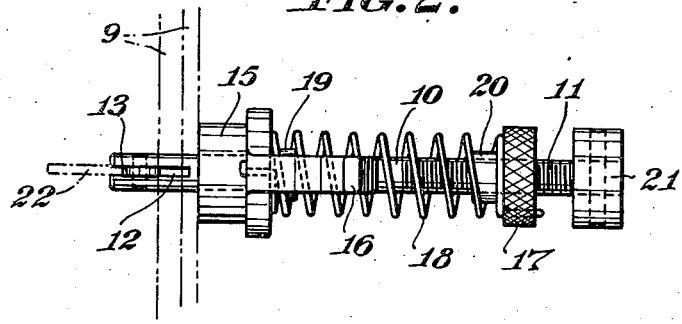
INVENTORS
W. J. WHITEHEAD and
C. S. WHITEHEAD Patented May 4, 1943

2,318,548

UNITED STATES PATENT OFFICE 2,318,548

MEANS FOR TEMPORARILY RETAINING MEMBERS TOGETHER

Walter John Whitehead and Cecil Stanley Whitehead, Rochester, England

Application June 1, 1942, Serial No. 445,348
In Great Britain January 16, 1942

1 Claim. (Cl. 85—3)

This invention relates to a means for temporarily clamping together two or more members such as plates. The invention is particularly, although not essentially intended to retain plates or like members in position whilst they are fixed permanently, for example, by welding or riveting, the retaining means according to this invention being capable of easy insertion and removal.

Broadly according to this invention there is provided a clamping device comprising a shank member provided with a movable latch or the equivalent capable of taking up a position in which it will pass through coinciding apertures in members which are to be held together, and which is adapted after passing clear of said members to take up a locking position in which it will abut one of said members to prevent the shank member being withdrawn, an abutment device provided on said shank member and which can be adjusted therealong, a retaining member slidably mounted on said shank member and a compression spring interposed between said retaining member and an abutment on the shank member, the arrangement being such that the retaining member can slide back along the shank member and against the action of the spring to allow the shank member to be passed through the aligning holes to an extent sufficient for the latch to take up its locking position, and such that on releasing the rod the spring will set up clamping pressure between the retaining member and the latch.

The adjustment of the abutment device provided for the spring, which preferably is achieved by providing a screw thread mounting for said device, enables the tension of the spring to be readily adjusted for a given clamping depth between the latch and the retaining member, whilst on the other hand it also enables the said clamping depth to be varied whilst keeping to a predetermined tension pressure of the spring.

Preferably the latch is pivotally mounted in a longitudinal slot formed in the shank member and is so dimensioned as to present no lateral projection from the shank member when positioned for insertion of the device, and has a tapered nose piece which then projects from the end of said shank member, said taper serving to lead the device into the coinciding holes in the members which are to be clamped together. The retaining member may be provided with wing-like finger pieces for easy manipulation of said retaining member.

A clamping device constructed according to a practical embodiment of the invention is illustrated in the accompanying drawing wherein:

Figure 1 is a side elevation of the device shown in use and serving to clamp together two plates which are shown by dot-and-dash lines, Figure 2 is a plan view of Figure 1.

The device illustrated comprises a shank member consisting of a rod 10 formed with a screw thread 11 extending part-way along said rod from one end thereof, and formed at the other end with a longitudinally extending slot 12. In the said slot 12 there is mounted a latch 13 carried by a pivot pin 14 which extends across said slot. Said latch is adapted to have movement about said pivot pin so that to permit insertion of the device through coinciding holes formed in plate-like members 9 which are to be clamped together, the said latch can be brought to the position indicated by dot-and-dash lines; in this position the latch presents no lateral obstruction from the rod 10.

A collar 15 is slidably mounted on the plain portion of the rod 10, said collar being provided with oppositely-disposed outwardly-extending finger pieces 16. A nut 17 having a knurled periphery is engaged with the screw thread 11 of the rod, and a coil compression spring 18 which encircles the rod and has its ends engaged upon bosses 19, 20 on the collar and nut respectively, urges apart said collar and nut. The tension of the spring can be varied or the clamping depth can be varied for a given tension of the spring by adjusting the nut along the thread 11, the outward movement of said nut being limited by a stop piece 21 fixed on the back end of the rod.

It will be understood that when the parts are in the positions shown, the spring 19 exerts clamping pressure between the retaining collar 15 and the latch 13 thereby firmly clamping together the plates 9; said spring is adapted to yield to allow the rod 10 to be pushed through the plates 9 to an extent sufficient for the latch to move from one to the other of its alternative positions.

In order to set the device for use, the nut 17 is set in accordance with the clamping depth and required clamping pressure, and the latch 13 is brought to the position shown in dotted lines, the retaining collar 15 being held back by the fingers whilst the stop piece 21 rests in the palm of the hand. The latch is so formed that in its said position it has a tapered nose piece 22 projecting from the end of the rod 10.

In using the device after setting and when holding same as above explained, the nose piece 22 is introduced into the coinciding holes in the plates 9 and the tapered form of said nose piece serves to guide the fore end of the rod 10 into said holes. When the rod has been inserted to such an extent that the latch is clear of the plates 9, said latch is swung through a right angle to bring its major axis perpendicular to the centre line of the rod, the latch projecting at each side of the rod as shown in full lines in Figure 1. The retaining collar 15 is now released, with the result that the spring 18 exerts itself to press towards one another the said collar 15 and the latch 13, the plates 9 consequently being clamped together firmly. To remove the device the rod 10 is pushed forwards sufficiently for the latch to be brought to its position aligned with said rod, whereupon the device can be withdrawn from the plates 9.

It will be observed that the latch 13 can be swung in either direction to bring it from its initial position to an operative position, the latch in each case having to be returned to its original position to effect release.

We claim:

A device for temporarily clamping together juxtaposed apertured plate members or the like, comprising, a shank provided at one end with a slot, a latch pivotally mounted in the slot and adapted to assume positions respectively in line with and at right angles to the shank, a stop piece at the end of the shank opposite the slot and whose outer face constitutes a rest for the palm of the operator's hand when manipulating the device, an abutment movably mounted on the shank in adjustable relation to the inner face of said stop piece, a spring surrounding the shank and having one end in engagement with the said adjustable abutment, a retaining collar mounted for free sliding movement on the shank and having its inner face in engagement with the other end of the spring, and laterally disposed finger pieces on the retaining collar adapted to be engaged by the fingers of the operator when his palm rests on said stop piece to manipulate the retaining collar against the force of said spring.

WALTER JOHN WHITEHEAD.
CECIL STANLEY WHITEHEAD.